US007866570B2

(12) United States Patent
Griffin

(10) Patent No.: US 7,866,570 B2
(45) **Date of Patent: *Jan. 11, 2011**

(54) STAND FOR OSCILLATING WAVE-TYPE SPRINKLER

(76) Inventor: Randall Griffin, 89 Heathrow Dr., Riverdale, GA (US) 30274

( * ) Notice: Subject to any disclaimer, the term of this patent is extended or adjusted under 35 U.S.C. 154(b) by 572 days.

This patent is subject to a terminal disclaimer.

(21) Appl. No.: 11/800,622

(22) Filed: May 7, 2007

(65) Prior Publication Data

US 2007/0205304 A1 Sep. 6, 2007

Related U.S. Application Data

(63) Continuation-in-part of application No. 11/222,467, filed on Sep. 8, 2005, now Pat. No. 7,708,210.

(51) Int. Cl.
*A01G 25/09* (2006.01)
*B05B 17/00* (2006.01)

(52) U.S. Cl. ........................ 239/1; 239/280; 239/280.5; 239/242; 239/276; 239/281; 248/81

(58) Field of Classification Search .................... 248/81
See application file for complete search history.

(56) References Cited

U.S. PATENT DOCUMENTS

| | | | | |
|---|---|---|---|---|
| 207,756 | A | 9/1878 | Maguire | |
| 755,403 | A | 3/1904 | Sipe | |
| 1,223,276 | A | 4/1917 | Haney | |
| 2,495,995 | A * | 1/1950 | Warrens et al. | 248/82 |
| 2,792,257 | A | 5/1957 | Davis | |
| 4,089,469 | A | 5/1978 | Greig | |
| 4,521,036 | A | 6/1985 | Howell, Jr. et al. | |
| 4,529,156 | A | 7/1985 | Heuer | |
| 4,789,099 | A | 12/1988 | Hager | |
| 4,824,020 | A | 4/1989 | Harward | |
| D302,458 | S | 7/1989 | Locklair, Jr. | |
| 5,439,176 | A | 8/1995 | Bussiere | |
| D369,649 | S | 5/1996 | Brown | |
| 5,730,366 | A | 3/1998 | DeWitt | |
| 5,836,516 | A | 11/1998 | Van Epps et al. | |
| 5,845,850 | A | 12/1998 | Guo | |
| 6,015,098 | A | 1/2000 | Krueger | |
| 6,322,027 | B1 | 11/2001 | Hsu | |
| 7,097,117 | B2 * | 8/2006 | Zur et al. | 239/276 |
| 2002/0092931 | A1 | 7/2002 | Coote | |

* cited by examiner

*Primary Examiner*—Dinh Q Nguyen
(74) *Attorney, Agent, or Firm*—Innovative IP, PLC; Sandra M. Sovinski, Esq.

(57) ABSTRACT

A sprinkler stand for holding an oscillating sprinkler in an elevated and generally vertical orientation to provide a desired sprinkler coverage pattern, wherein a sprinkler holder holds a sprinkler, a frame elevates and supports the sprinkler holder, and a base supports the frame. Preferably, the sprinkler holder includes two tracks for engaging base members of a sprinkler, wherein the tracks allow for the repositioning of the sprinkler so as to vary the sprinkler elevation, the height of the sprinkler holder is adjustable by moving the holder along the frame, or by adding a frame extender to the frame, and the sprinkler holder may be rotated, or the frame rotatably or angularly adjusted to achieve a desired sprinkler orientation.

14 Claims, 7 Drawing Sheets

STAND FOR OSCILLATING WAVE-TYPE SPRINKLER

CROSS-REFERENCE TO RELATED APPLICATION

This application claims priority to and the benefit of, and is a Continuation-in-Part of U.S. Utility patent application Ser. No. 11/222,467, filed Sep. 8, 2005, now U.S. Pat. No. 7,708,210, entitled "Stand for Oscillating Wave-Type Sprinkler".

FIELD OF THE INVENTION

This invention relates in general to stands for watering devices. In particular, this invention relates to a stand for an oscillating tube water sprinkler that both elevates the sprinkler and maintains it in a generally vertical position.

BACKGROUND OF INVENTION

Oscillating water sprinklers are well known and their use constitutes a popular method of watering a lawn or garden. Typically, an oscillating water sprinkler includes a base formed by two generally straight and opposing parallel members that join two generally curved opposing end portions. A perforated spray tube, which receives and projects water, is coupled to and supported by the base. Water may be supplied to the perforated tube by a hose so that the force of the water causes the tube to oscillate and project water in a spray pattern that covers a generally rectangular region around the sprinkler base.

The area that receives the water projected by the sprinkler may be referred to as the sprinkler coverage area. In general, the oscillating sprinkler is positioned horizontally so that both parallel members of the sprinkler base are in contact with the ground. The locus of the sprinkler typically defines the midpoint of the sprinkler coverage area generated when the tube is free to oscillate to its fullest extent. In an alternative mode of sprinkler operation, the perforated tube may be locked in a position that limits the oscillation of the tube so that the spray pattern is directed to a smaller area, for example, only one side of the sprinkler.

The ability of an oscillating sprinkler to adequately deliver water to a desired area is dependent on the volume of water delivered to the sprinkler, the height of vegetation proximate to the sprinkler, and the position and orientation of the sprinkler spray tube relative to the intended watering area. Tall shrubbery, vegetation, or other obstructions in the vicinity of the sprinkler may diminish the sprinkler's efficacy by blocking a portion of the water streams projected from the sprinkler, thereby preventing some areas from receiving an adequate amount of water during the watering session.

Furthermore, because water is delivered to the sprinkler by a hose, which acts as a tether to a water source, the positioning of the sprinkler, and thus the reach of its projected spray, is constrained by water supply location and hose length. In addition, there are some situations in which a sidewalk, patio, driveway, or other surface which does not need to be watered intervenes between the sprinkler and the intended targeted area. In such circumstances it is desirable to project water beyond the intervening area, while at the same time avoiding the waste of resources that results when water is directed to such surfaces. At times it may be desirable to water only a relatively narrow area, such as a narrow lawn area that has been seeded, aerated, fertilized or otherwise cultivated. In those cases, the delivery of water to undesignated areas during the irrigation process wastes resources, increases the time required to adequately water the designated area due to the volume of water diverted, and results in increased monetary costs.

To avoid blockage by vegetation and thereby increase the distance over which the water may be projected from a particular sprinkler location, the oscillating sprinkler may be elevated a vertical distance above the ground. When the sprinkler is elevated, water projected from the sprinkler is more likely to travel over nearby vegetation rather than being obstructed by it. In some watering applications, however, it is desired to not only avoid structural or vegetative obstructions, but also to alter the spray pattern and shape of the corresponding sprinkler coverage area.

For a relatively narrow area extending at a distance from the sprinkler, sprinkler elevation alone is insufficient for producing a sprinkler coverage area that more nearly correlates with the size and shape of the targeted lawn area. By elevating the sprinkler and holding it in a generally vertical position in which the sprinkler spray tube is oriented either perpendicular or at some relative angle to the ground rather than horizontally in parallel with the ground, the spray pattern may be altered to concentrate on the desired swath. The spray coverage may also be modified by locking the oscillating tube in a position which best directs the water to a desired area.

Previous attempts have been made to address the need for an elevated oscillating tube sprinkler by teaching sprinkler stands, wherein a sprinkler is maintained in an elevated position. Although adequate for their intended purposes, none has taught a sprinkler stand that engages and maintains an oscillating sprinkler in a stable vertical orientation in order to produce a beneficial spray pattern and associated sprinkler coverage area for a narrow designated lawn area.

One type of device holds a garden hose whereby water can be directed in a desired direction via a vertical rod to which a hook for supporting an annular sprinkler head or other type of sprinkler heads or nozzles is coupled. Although it may be possible to hang an oscillating sprinkler on such a hook, the device is not adapted for nor well-suited for securely maintaining the twin base members of a typical oscillating sprinkler in a desired orientation. When used with an oscillating sprinkler, such a stand would most likely cause the sprinkler to shake, move, or dislodge in response to the force of the water projected therefrom. Further, such a device, if used in conjunction with an oscillating sprinkler, would lack disadvantageously angular and rotational adjustability of the sprinkler orientation in order to achieve a desired spray pattern.

Another type of stand is a pedestal for supporting an oscillating sprinkler at an elevated height above the ground, wherein the pedestal firmly engages the sprinkler base so as to securely hold the sprinkler in a particular position. However, such stands disadvantageously limit the sprinkler to a horizontal orientation. Thus, although the elevation of the sprinkler, alone, may prove beneficial, such a pedestal does not provide a means for adjusting the height of the sprinkler; nor is adapted for rotative or angular adjustment of the sprinkler orientation in order to achieve a customized spray pattern for a particular irrigation application.

Other types of devices have been described for use with an oscillating sprinkler to produce an optimal spray pattern, specifically pertaining to the size, shape, and arrangement of the nozzles of the spray tube. Nozzle arrangements have been suggested in order to alter the spray pattern of a typical oscillating sprinkler to address the problem of sprayer-induced puddling, wherein an undesirable concentration of water is applied at certain points of the oscillating cycle of the spray tube. While adequate for its intended purpose, such an adaptation to a standard oscillating sprinkler does not provide a means by which the spray pattern and sprinkler coverage area of the sprinkler may be uniquely tailored to conform to a particular application; particularly when is required to irrigate a specific region while avoiding watering undesignated areas.

Therefore, none of known devices overcome the limitations previously identified with oscillating sprinklers positioned horizontally on the ground. Thus, there is a need for a sprinkler stand adapted to securely engage an oscillating tube sprinkler and maintain the sprinkler in a stable, elevated and generally vertical orientation. There is a further need for a sprinkler stand for use with an oscillating sprinkler in which the sprinkler elevation and orientation may be adjusted so as to generate an optimum spray pattern and sprinkler coverage area for an intended application. In particular, there is a need for a sprinkler stand which secures a sprinkler at an orientation selected by the user to irrigate a relatively narrow designated area in a manner that increases the volume of water delivered to the designated area while decreasing the amount of water outside the designated, so that natural resources may be conserved, monetary costs may be reduced, and the time necessary to complete the watering operation may be shortened.

SUMMARY OF INVENTION

Briefly described, in a preferred embodiment, the present invention overcomes the above-mentioned disadvantages and meets the recognized need for such a device by providing a height adjustable sprinkler stand adapted to engage and support an oscillating sprinkler in an elevated and generally vertical or non-horizontal orientation.

According to its major aspects and broadly stated, in its preferred form, the present invention is a sprinkler stand that includes a sprinkler holder for engaging an oscillating sprinkler and holding it in a desired generally vertical orientation, a frame for supporting the sprinkler holder at an elevated position above the ground, and a base for supporting and maintaining the frame in a stable position. The sprinkler holder includes one or more tracks, which engage a portion of a sprinkler base and thereby maintain the sprinkler in a generally vertical orientation so that the sprinkler may produce a desired spray pattern and sprinkler coverage area for irrigating a designated region. The positioning of the sprinkler base within the tracks is adjustable, as is the relative positioning of the tracks in order to facilitate retention of a variety of sprinkler base widths. Further, because the sprinkler holder is movably coupled to the frame, the sprinkler holder elevation is also adjustable. Thus the elevation of a sprinkler engaged by a sprinkler stand of the present invention may be altered by adjusting the placement of the sprinkler within the sprinkler holder tracks and/or by adjusting the positioning of the sprinkler holder along the frame of the sprinkler stand.

More specifically, the sprinkler stand device of the present invention in an exemplary embodiment, is adapted to accommodate frame extensions to further increase the maximum frame height and sprinkler holder elevation. The movable coupling of the sprinkler holder to the frame also provides a means by which the sprinkler holder may be rotated about the frame in order to vary the direction of the sprinkler. The sprinkler holder may also be rotatively coupled to the frame in a pinwheel type of arrangement to provide further options for adjusting the orientation of the sprinkler.

The sprinkler stand base may be composed of a plurality of legs arranged to provide stability and support to the frame and holder. In a preferred embodiment, the base is composed of three legs disposed in a tripod arrangement around the frame, facilitating the easy transportation, setup and relocation of the sprinkler stand. In a further embodiment, the base may comprise a stake member adapted for insertion into the ground. The frame may be adjustably coupled to the base, such as swivably attached via a ball-and-socket junction so as to allow both rotative and angular adjustment of the frame orientation and provide for further adjustment of the spray pattern and sprinkler coverage area of an engaged sprinkler, or such as via a ratchet or gear-like arrangement to facilitate focused and direct angular adjustment.

BRIEF DESCRIPTION OF THE DRAWINGS

The advantages and operation of the present invention will become more readily apparent from the following description and accompanying drawings in which.

DETAILED DESCRIPTION

As required, exemplary embodiments of the present invention are disclosed herein. The accompanying drawings, included to provide a clearer understanding of the invention, are not drawn to scale and some features may be minimized or eliminated to prevent obscuring novel aspects of the invention. It is noted that the embodiments described herein are only examples and that the invention may be practiced in various and alternative forms. Specific structural and functional details disclosed are not to be interpreted as limiting, but rather as a basis for teaching the invention and supporting the claims. In describing the preferred and alternate embodiments of the present invention, as illustrated in the figures and/or described herein, specific terminology is employed for the sake of clarity. The invention, however, is not intended to be limited to the specific terminology so selected, and it is to be understood that each specific element includes all technical equivalents that operate in a similar manner to accomplish similar functions.

The present invention provides a height-adjustable sprinkler stand adapted to engage the base of an oscillating sprinkler and thereby maintain the sprinkler in an elevated and generally vertical orientation so that a desired spray pattern and sprinkler coverage area may be achieved. The sprinkler stand is particularly useful for supporting a sprinkler at an orientation that is beneficial for watering a narrow land region. A sprinkler stand in accordance with the invention includes a sprinkler holder for engaging a sprinkler and holding it in a desired vertical position, a frame for supporting and elevating the sprinkler holder, and a base for supporting and stabilizing the frame. The elevated and generally vertical orientation of the sprinkler results in a spray pattern and corresponding sprinkler coverage area conducive for watering a relatively narrow land area in a manner that increases the volume of water delivered to a desired area and decreases the amount of water delivered outside the designated area. Thus the present invention reduces costs by decreasing water consumption and decreasing the amount of time necessary to adequately water a designated area.

Figure 1:
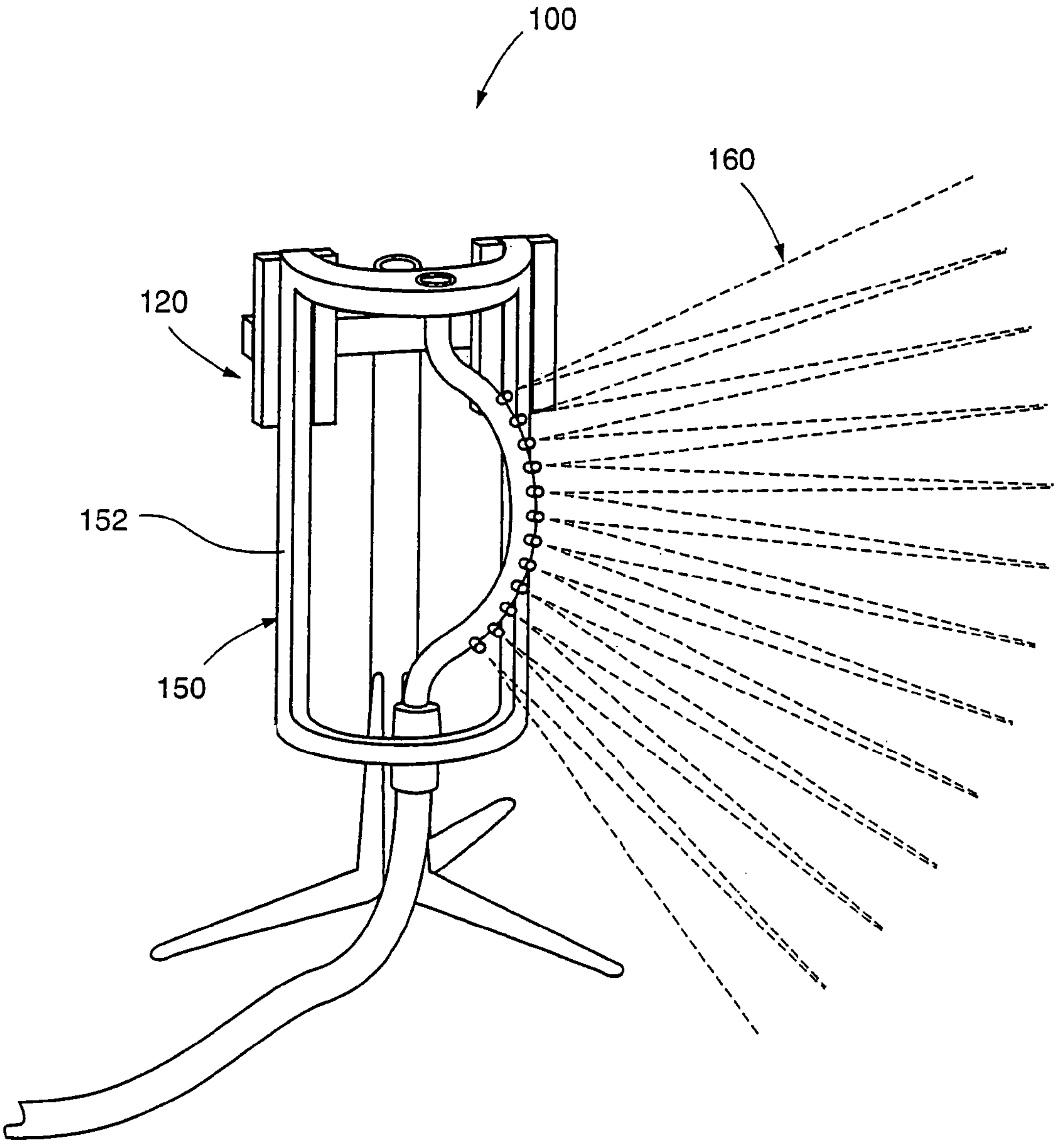
FIG. 1 is a perspective view of a sprinkler system in accordance with an exemplary embodiment of the invention.

FIG. 1 shows Sprinkler system 100 of the present invention. Sprinkler stand 120 engages sprinkler 150, which projects fan-shaped spray pattern 160. As shown in FIG. 1, sprinkler stand 120 holds sprinkler 150 in a generally vertical position so that sprinkler base members 152 are generally perpendicular to the ground and spray tube 80 is in a generally vertical position, to provide a desired spray pattern and sprinkler coverage area.

Figure 2:
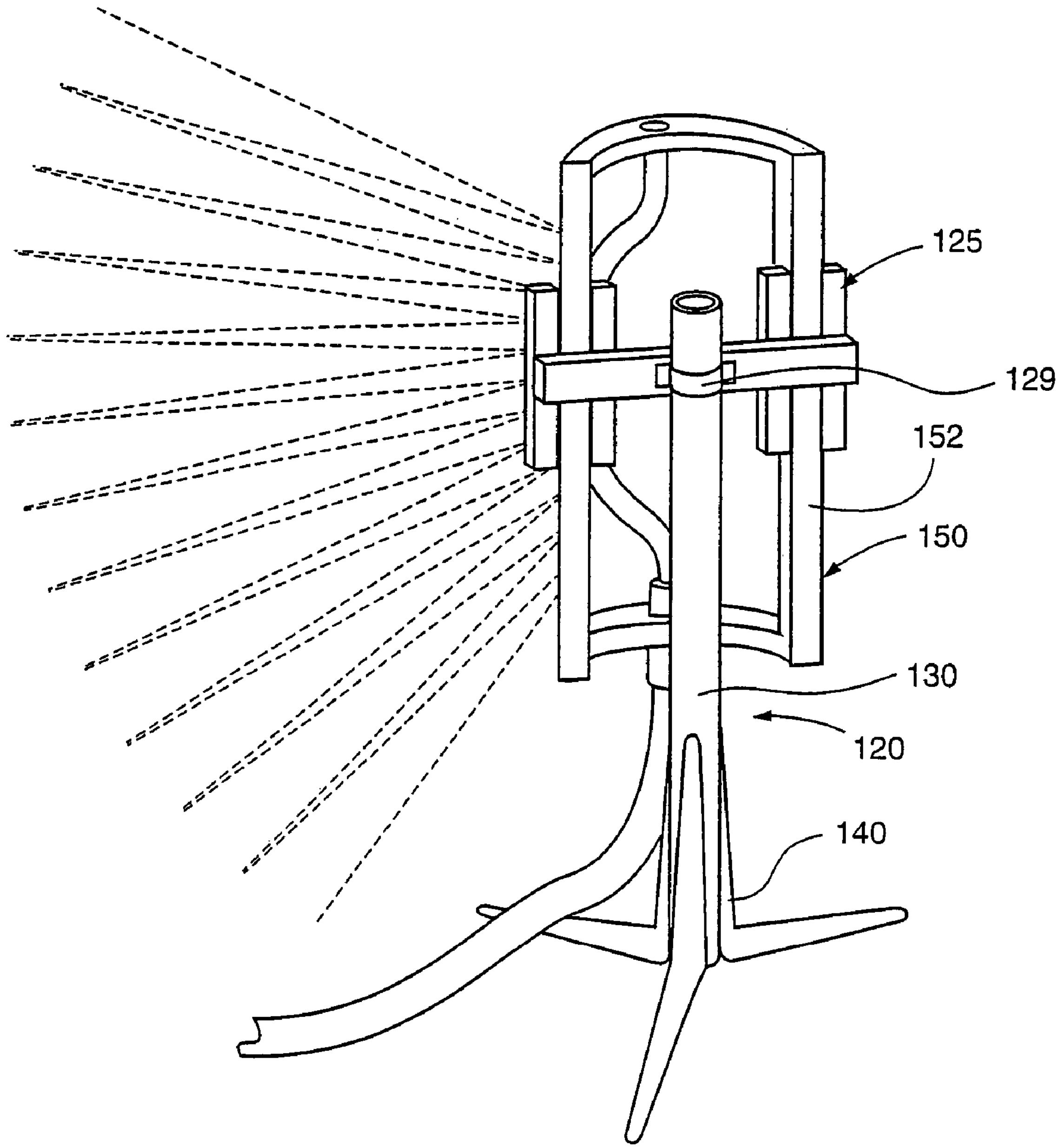
FIG. 2 is a perspective view of the sprinkler system of FIG. 1.

FIG. 2 depicts a rear view of sprinkler system 100. As seen from FIG. 2, sprinkler stand 120 comprises sprinkler holder 125 which preferably holds sprinkler 150 in an elevated and generally vertical orientation, frame 130 that preferably supports and elevates sprinkler holder 125, and base 140 that preferably supports and maintains frame 130 in a vertical and stable position. As shown in FIG. 2, sprinkler holder 125 preferably holds sprinkler 150 by engaging the middle portions of sprinkler base members 152. However, sprinkler holder 125 may engage sprinkler 150 at a variety of positions along base members 152 so that variable sprinkler elevations may be achieved. This advantageous feature of the invention can be understood from a comparison of FIGS. 1 and 2. In FIG. 1, sprinkler holder 125 engages an upper portion of base members 152, whereas in FIG. 2, the middle portions are engaged. By adjusting sprinkler 150 within sprinkler holder 125, the user is able to adjust the elevation of sprinkler 150 for optimum coverage of a designated area.

Preferably, sprinkler holder 125 may be movably coupled to frame 130 via coupler 129. Coupler 129 may be a clamp, clasp, or other type of coupler that, when loosened or adjusted, allows sprinkler holder 125 to be repositioned at variable heights along frame 130. The adjustability of sprinkler holder 125 position along frame 130 provides an additional means by which the elevation of sprinkler 150 may be varied in order to optimally irrigate a desired area. The movable coupling also preferably allows a user to rotate sprinkler holder 125 about frame 130 to point sprinkler 150 in a particular direction.

Figure 3:
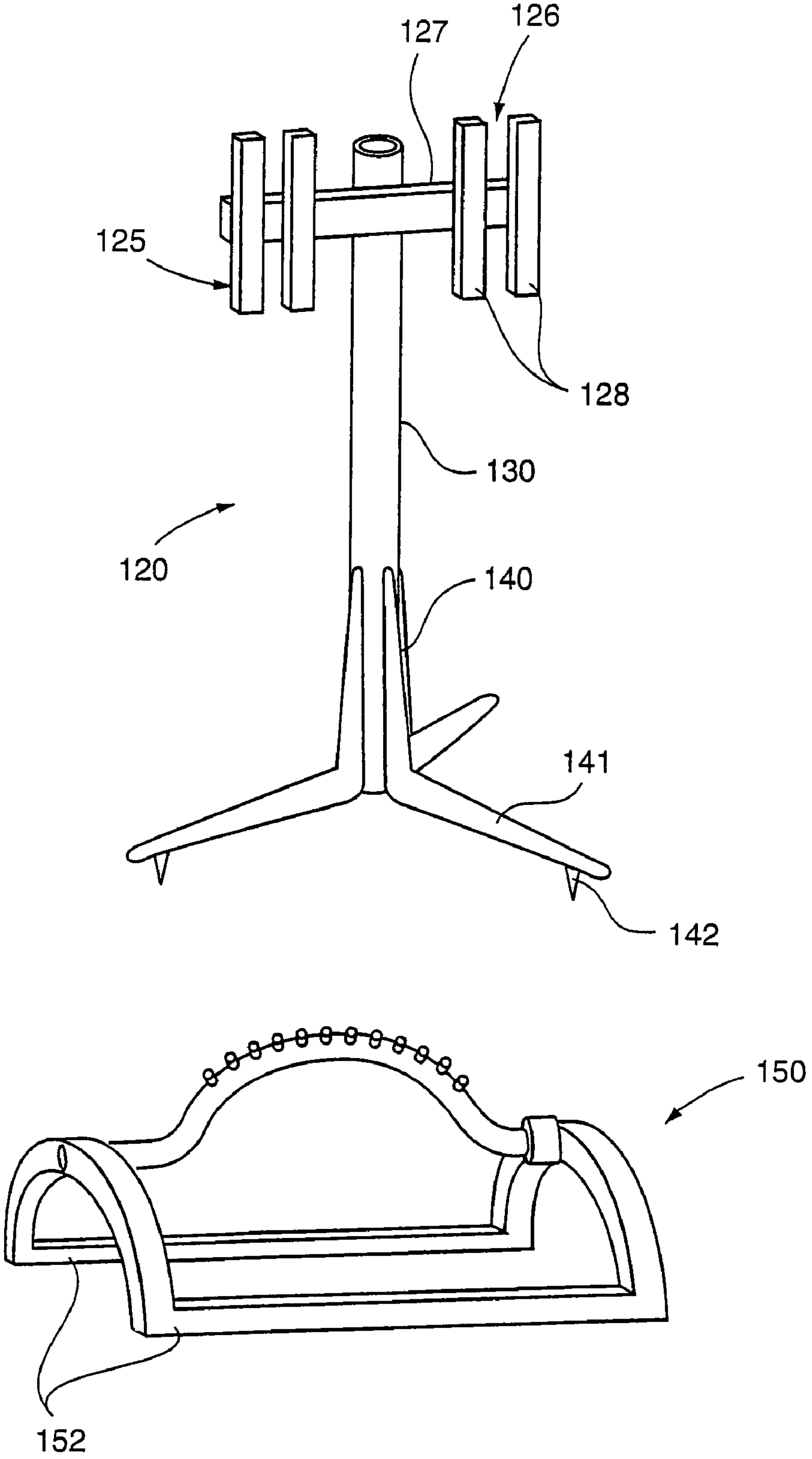
FIG. 3 is a perspective view of an exemplary embodiment of the invention.

FIG. 3 shows the front of sprinkler stand 120 and unattached oscillating sprinkler 150. As shown in FIG. 3, sprinkler holder 125 may include one or more tracks 126 adapted for receiving a portion of base member 152 of sprinkler 150 and holding it in a preferred, generally vertical orientation. Sprinkler holder 125 may also include crossbar 127 that is coupled to and supports tracks 126 on frame 130.

The width of track 126 is preferably adapted for allowing receiving and holding sprinkler base member 152 within track 126 so that sprinkler base member 152 is preferably securely fitted within the track and against crossbar 127. In a preferred embodiment, the track width is dimensioned to engage a standard sprinkler base member 152 of standard width, however, preferably, the track width is slidably adjustable along crossbar 127 in order to facilitate adaptation to a variety of sprinkler base member widths. The interior surfaces of track 126 may be angled, shaped, lined with a compressible substance, or otherwise formed to facilitate receiving and holding sprinkler base members 152, such as providing a compression fitting.

In the exemplary embodiment of the invention shown in FIG. 3, sprinkler holder 125 has two opposing tracks 126. Preferably, two tracks 126 may be separated by a distance along crossbar 127, such that each track 126 may engage a base member 152 so that sprinkler 150 may be securely positioned. In an alternate embodiment, sprinkler holder 125 may contain single track 126 for the engagement of a single sprinkler base member 152. It is noted that the two tracks 126 depicted in FIG. 3 may, if desired, be used to engage two sprinklers, with one track 126 engaging a single base member 152 of a first sprinkler, and the other track 126 engaging a single base member of a second sprinkler. Similarly, sprinkler holder 125 may contain more than two tracks 126 in order to accommodate multiple sprinklers 150.

Preferably, track 126 comprises two opposing track members 128 coupled to crossbar 127 and separated by a track width adapted for receiving sprinkler base member 152. Track members 128 are preferably fixedly coupled to crossbar 127, for example by an adhesive, nails or other fasteners. Alternatively, track members 128 may be removably coupled, by way of example but not of limitation, by screws, pegs, bolts or other removable fasteners. Track members 128 may be positioned along crossbar 127 to form tracks 126 of a predetermined width that are separated by a predetermined distance along crossbar 127. In an exemplary dual track embodiment, the predetermined track width and separation distance are such that two sprinkler base members 152 of sprinkler 150 may be engaged in the sprinkler holder 125. Track members 128 that are removably coupled to crossbar 127 may be repositionable so that track width and track separation distance may be adjusted in order to accommodate sprinklers 150 of various sizes and dimensions.

Sprinkler holder 125 is supported by frame 130. Shown in FIG. 3 as preferred generally cylindrical in shape, frame 130 may be variously shaped and adapted for coupling with sprinkler holder 125. Frame 130 may be composed of wood, metal, or a synthetic substance such as PVC that is of sufficient rigidity to support sprinkler holder 125 and oscillating sprinkler 150. Frame 130 may be solid or hollow or may comprise both solid and hollow portions. As mentioned earlier, the coupling of the crossbar 127 to frame 130 may allow movement of crossbar 127 along frame 130 so that the elevation of sprinkler holder 125 can be adjusted to better suit the needs of the user. Further, crossbar 127 may be rotatively coupled to frame 130 so as to allow the user to spin or rotate sprinkler holder 125 to orient sprinkler 150 at a desired angle so as to achieve an optimum spray pattern and sprinkler coverage area for the application at hand.

Preferably, supporting and stabilizing frame 130 of sprinkler stand 120 is base 140. In the exemplary embodiment shown in FIG. 3, base 140 comprises three legs 141 disposed in a tripod arrangement and coupled to a lower portion of frame 130. Applicant has found that legs 141 comprising a first portion in contact with the frame and a second portion, disposed at an angle from the first portion and extending outward from frame 130 and in contact with the ground, as shown in FIG. 3, work well. The second portion outward extensions provide stability and prevent sprinkler stand 120 from tipping over. However, legs 141 of alternative shapes may also function as a base 140 to support and stabilize frame 130 of a sprinkler stand 120 in accordance with the invention. Further, in order to facilitate secure placement on potentially uneven ground surfaces, spikes 142, or stakes, could be provided on legs 141, wherein spikes 142 could serve to anchor legs 141 to the ground.

Likewise, the number of legs 141 employed may be variable, depending on their size, shape, and disposition. Legs 141 may be made of plastic, metal, PVC or other substance having sufficient characteristics to support frame 130. Legs 141 may be coupled to frame 130 by screws, bolts, adhesives or other coupling means. Legs 141 may also be integrally molded with frame 130 to form a unitary structure. The sprinkler stand 120 with base 140 comprising tripod arrangement of legs 141 is easy to transport and easy to set up and operate. No on-site assembly is required, nor is it necessary to anchor the sprinkler stand 120. Because it is free-standing it is easily relocated upon the completion of a watering operation.

Figure 4:
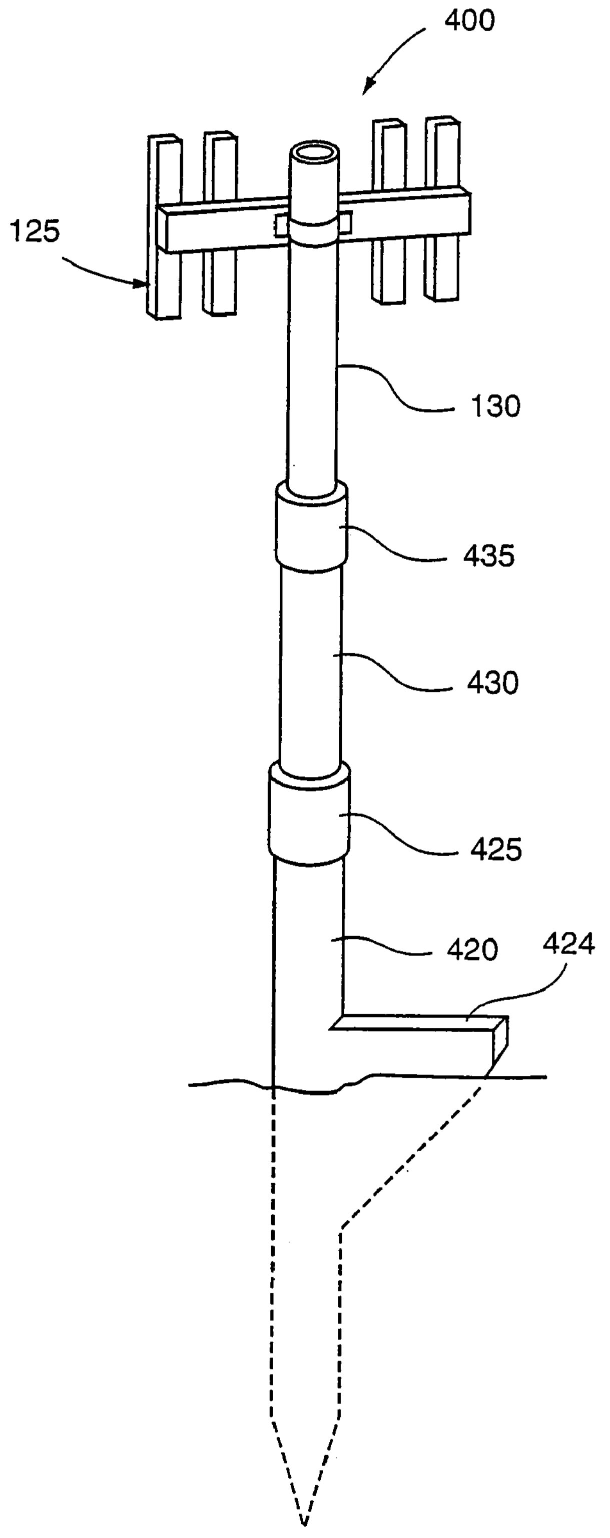
FIG. 4 is a perspective view of a further embodiment of the invention.

Referring to FIG. 4, a further embodiment 400 of the present invention is depicted. In this embodiment, sprinkler stand base 140 comprises stake member 420. Stake member 420 preferably includes a longitudinal portion with a pointed extremity for insertion into the ground. Stake member 420 may also include extension 424 generally perpendicular to the longitudinal portion and adapted for receiving an applied force, such as foot pressure, when stake member 420 is driven into the ground. Stake member 420 may be composed of wood, metal, PVC, or other substance having sufficient characteristics for frame 130 support and ground insertion.

The exemplary embodiment 400 depicted in FIG. 4 includes frame extender 430. Frame extender 430 may be coupled to frame 130 and stake member 420 in a telescopic type of arrangement of coupled members of increasing or decreasing diameters. By employing frame extender 430, the height of sprinkler stand 120 may be increased, thereby increasing the elevation range of a sprinkler engaged therein so as to achieve a desired spray pattern and sprinkler coverage area.

In an exemplary embodiment, frame extender 430 may be adapted for coupling with frame 130 via frame coupler 435. Frame extender 430 may comprise a hollow portion adapted to adjustably receive a lower portion of frame 130. In one embodiment, frame 130 may be moveable within frame extender 430 to attain a desired height. When a desired height is achieved, the position of frame 130 relative to frame extender 430 may be secured using frame coupler 435. By way of example, and not of limitation, frame coupler 435 may be tightened or loosened by screwing so that when frame coupler 435 is loosened, frame 130 is movable within frame extender 430, but when tightened, frame coupler 435 prevents movement of frame 130. Frame coupler 435 may be a collar, ring, or other type of open-ended coupler adapted to couple frame 130 and frame extender 430. Alternatively, frame extender 430 may be adapted to receive a predetermined portion of frame 130 rather than an adjustable portion. Frame coupler 435 may comprise ends of differing diameters in order to couple with both frame 130 and frame extender 430, which may be of differing diameters when a telescopic arrangement is employed.

Frame extender 430 may be coupled to stake member 420 via base coupler 425. Stake member 420 may comprise a hollow portion adapted for receiving a portion of frame extender 430 and base coupler 425 may then be used to secure the position of frame extender 430 within stake member 420. Base coupler 425 may be a ring, socket, collar or other type of open-ended coupler adapted to couple stake member 420 and frame extender 430.

Alternatively, frame extender 430 may comprise a hollow portion adapted for receiving a portion of stake member 420. For example, the lower portion of frame extender 430 may comprise a cylinder or sleeve adapted for slipping over a portion of stake member 420. Base coupler 425 may then be used to secure the position of frame extender 430 in relation to stake member 420. In a similar manner, if frame extender 430 is not desired for a particular application, frame 130 may be directly coupled to stake member 420 via base coupler 425 adapted to couple stake member 420 with frame 130.

The exemplary embodiment 400 employs a base comprising stake member 420; however, frame extender 430 may also be used with sprinkler stand 400 supported by other types of bases, for example a base comprised of a plurality of legs 141. Legs 141 may be coupled to a base member or receptacle that is adapted for coupling with frame extender 430.

Figure 5:
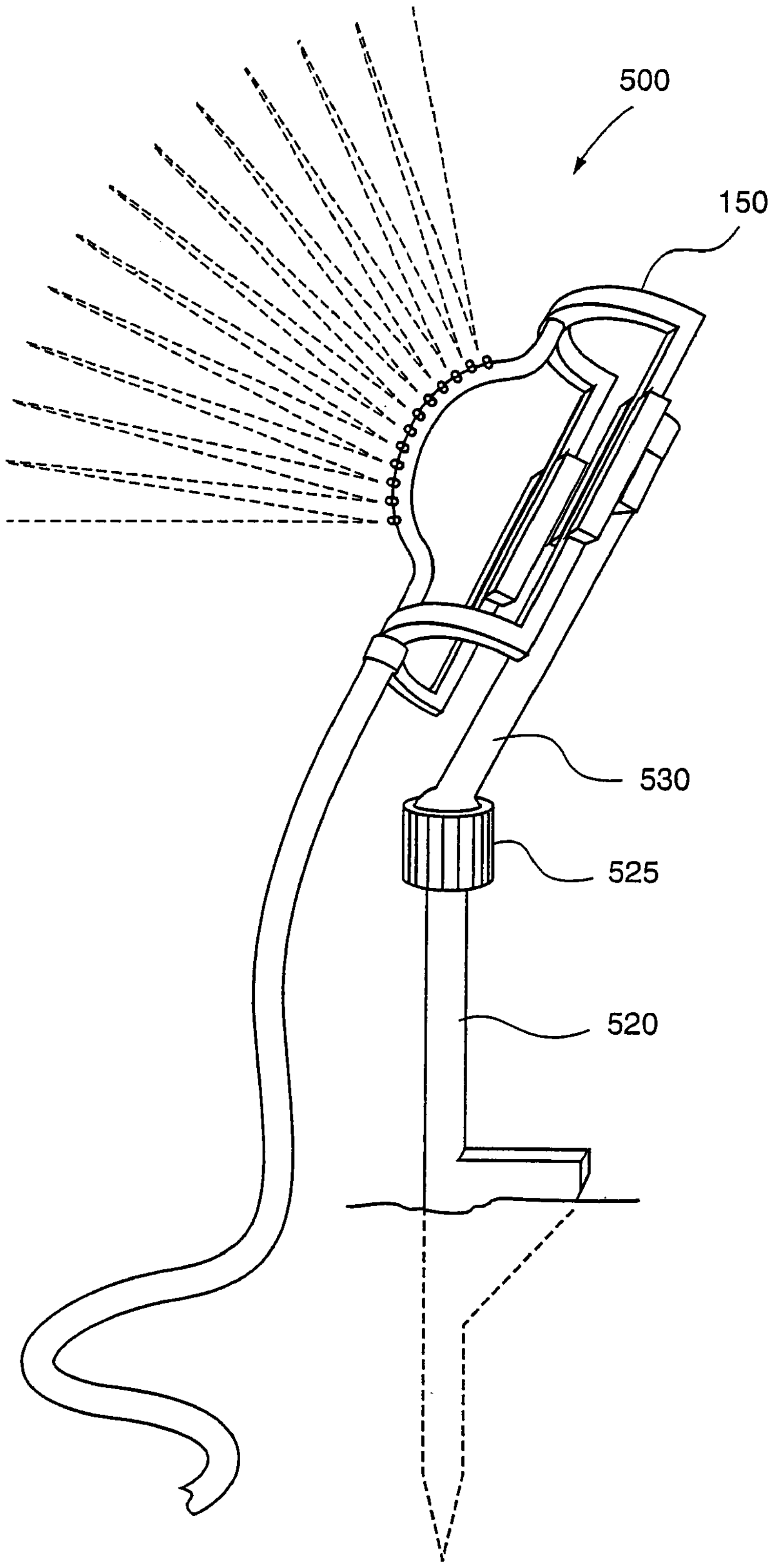
FIG. 5 is a perspective view of an exemplary embodiment of the invention.

FIG. 5 depicts an exemplary embodiment 500 of a sprinkler system in which frame 530 is swivelably coupled to base 520, shown as a stake, by socket coupler 525. Socket coupler 525 is cylindrically shaped and adapted to receive the lower end portion of frame 530. Frame 530 has a rounded lower end portion resembling a ball that is adapted for coupling with socket coupler 525 to form a ball-and-socket junction. The ball-and-socket junction of frame 530 and base 520 allows frame 530 to swivel so that both rotational and angular adjustments may be made to modify frame 530 orientation and thus optimize water delivery to a designated area. Frame 530 may be swiveled to tailor the sprinkler coverage area to the size and shape of the lawn area to be watered. By tailoring the sprinkler coverage area to the designated area to be watered, less water is wasted on unintended areas, thereby reducing the amount of water consumed during the watering process. Because more of the water supplied to sprinkler 150 is delivered to the intended area, the amount of time spent watering a designated area may also be reduced.

A further advantage of the ball-and-socket junction embodiment depicted in FIG. 5 is the ease with which the coverage area may be changed. For example, frame 530 may be positioned at a particular orientation so that sprinkler 150 of sprinkler system 500 delivers water to a particular ground area. When the designated ground area is adequately watered, it may be desired to water a second area within the range of sprinkler 150 of sprinkler system 500. Frame 530 may simply be rotated and angularly adjusted so that sprinkler 150 may deliver water to the second area. No repositioning of base 520 is necessary, nor must frame 530 be uncoupled from base 520, reoriented, and subsequently recoupled.

Shown in FIG. 5 as coupling frame 530 to base 520 comprising a stake, the ball-and-socket junction may also be employed with a legged or otherwise formed base 520. An embodiment comprising base 520 with legs 141 may include a frame receptacle adapted for receiving frame 530 via a socket coupler 525.

In an exemplary method of the invention, a user may designate a particular lawn area to be irrigated. The user may have just seeded, sodded, or aerated a lawn area; alternatively, the user may have recently planted trees, shrubs, flowers, vegetables or other plants. The designated area may be relatively narrow, and may also be located at the end of the length of hose used to deliver water to the watering device. Due to the narrow shape and distant location of the designated area, a specific spray pattern is required to adequately irrigate the designated area without wasting resources on undesignated areas.

The user may go to his garage or tool shed to retrieve a typical oscillating sprinkler 150, connect sprinkler 150 to a hose coupled to an outdoor spigot, and proceed with sprinkler 150 to the designated area. When sprinkler 150 is placed in a standard horizontal orientation on the ground, and water is supplied to sprinkler 150, the user may observe that the sprinkler coverage area is unacceptably wide when sprinkler 150 is positioned perpendicular to the designated strip area. When sprinkler 150 is oriented parallel to the strip, the user may observe that the sprinkler range is too short. In both instances water is delivered to undesignated areas, resulting in a waste of natural resources and an increase in the time required to conduct the irrigation operation.

To address the problem of inadequate and inefficient delivery of water to the designated area, the user may employ preferred sprinkler stand 120 of the present invention. The user may transport sprinkler stand 120 to the sprinkler 150 location and position it for use. When using sprinkler stand 120 with base 140 comprising a plurality of legs 141, the user simply sets the sprinkler stand on the ground in the vicinity of the sprinkler. When sprinkler stand base 140 comprises stake member 420, the user may drive stake member 420 into the ground.

The user may then insert sprinkler 150 into sprinkler holder 125 of sprinkler stand 120 by fitting a portion of each sprinkler base member 152 into track 126 of sprinkler holder 125. The user may then supply water to sprinkler 150 and observe the resultant spray pattern and water coverage area. If the spray pattern remains unsatisfactory, the user may want to adjust the elevation of sprinkler 150. The user may alter the elevation of sprinkler 150 by repositioning sprinkler base members 152 in sprinkler holder tracks 126 or by raising or lowering sprinkler holder 125 along frame 130 of sprinkler stand 120. The user may also add frame extender 430 to frame 130 in order to increase the height of sprinkler holder 125.

In addition to adjusting the sprinkler elevation, the user may also wish to alter the orientation of sprinkler 150 in order to optimize water delivery to the designated area. The user may simply turn sprinkler stand 120, an easy procedure when base 140 comprises a plurality of legs 141. Alternatively, the user may rotate sprinkler holder 125 about frame 130 or about a rotative coupler in order to point sprinkler 150 in a desired direction to achieve a desired orientation. When using sprinkler stand 120 in which frame 530 is coupled to base 520 via a ball-and-socket junction, the user may rotate and angularly adjust frame 530 to optimize the spray pattern of sprinkler 150. The user may then supply water to sprinkler 150 to irrigate the desired area. By employing sprinkler system 100 of the invention, the user is able to elevate and orient sprinkler 150 to deliver a sufficient volume of water to a designated area in a cost-effective manner which conserves natural resources.

Figure 6:
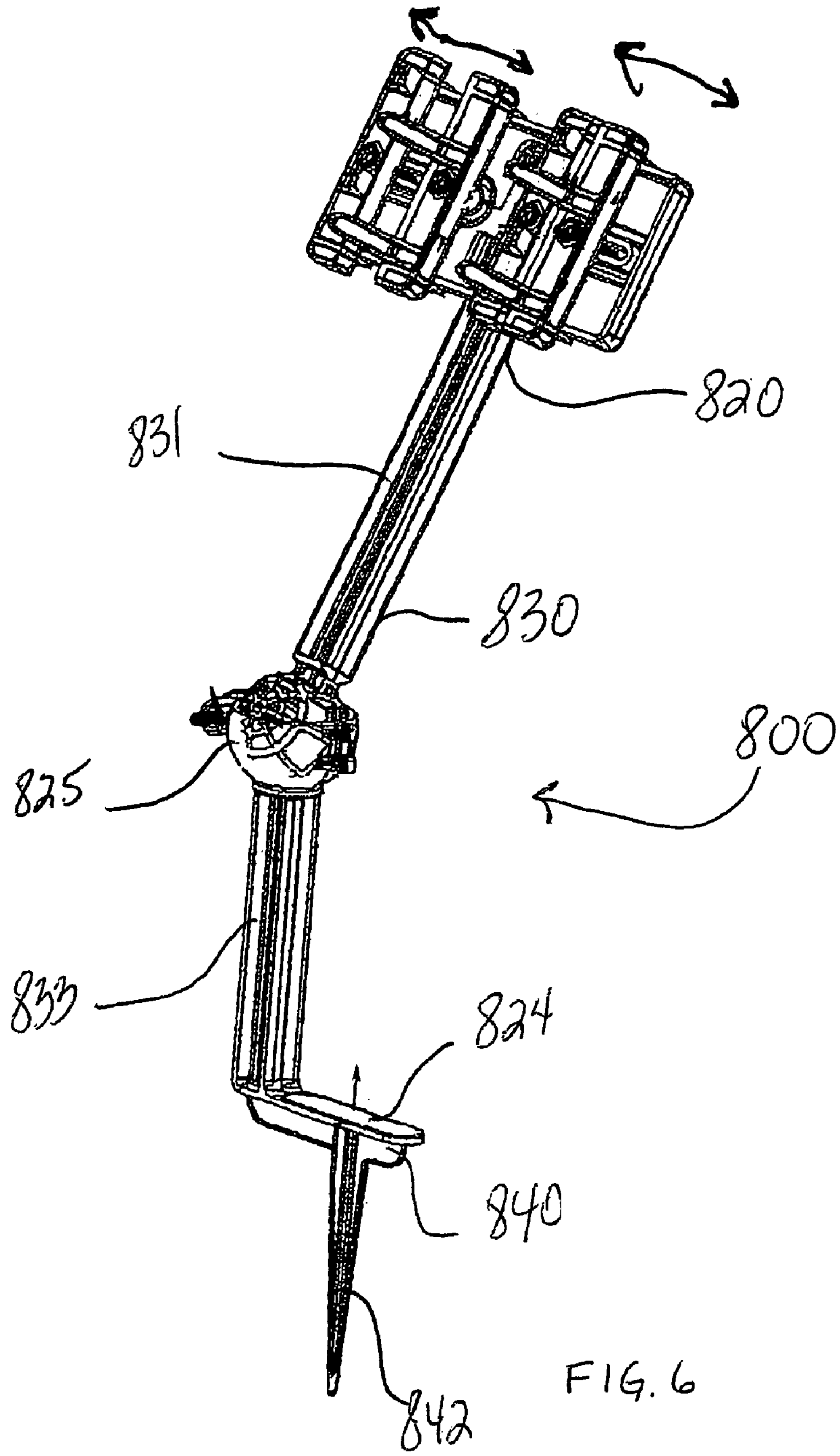
FIG. 6 is a perspective view of still a further embodiment of the invention.

Referring now to FIG. 6, sprinkler system 800 of the present invention is shown. Sprinkler stand 820 engages a sprinkler (not shown), holding same in a vertically adjustable position relative to the ground in order to enhance selectability of desired spray patterns and/or sprinkler coverage area. Frame 830 that supports and elevates sprinkler holder 820, and base 840 that supports and maintains frame 830 in a generally vertical and stable position are shown.

As depicted in FIG. 6, and by way of comparison with the other figures, frame 830 is composed of two portions, upper arm 831 and lower arm 833, wherein upper and lower arms 831 and 833 are pivotally related to define frame 830. Frame 830 is reinforcedly configured along its length, as shown, but may also be generally cylindrical in shape, or of any suitable and desirable shape and adaptation. Thus, frame 830 may be composed of wood, metal, or a synthetic substance such as PVC that is of sufficient rigidity to support sprinkler holder 825 and an oscillating sprinkler. Further, frame 830 may be solid or hollow or may comprise both solid and hollow portions.

In order to facilitate secure placement on potentially uneven ground surfaces, spike or stake member 842 is provided at base 840, wherein spike or stake member 842 serves to anchor frame 830 to the ground. Stake member 842 preferably includes a longitudinal portion with a pointed extremity for insertion into the ground. Stake member 842 also includes extension 824 generally perpendicular to the longitudinal portion and adapted for receiving an applied force, such as foot pressure, when stake member 842 is driven into the ground. Stake member 842 may be composed of wood, metal, PVC, or other substance having sufficient characteristics for frame 830 support and ground insertion.

In embodiment 800 of a sprinkler system, upper arm 831 and lower arm 833 are swivelably coupled by ball-socket coupler 825. Ball-socket coupler 825 is generally spherically-shaped and adapted to connect upper arm 831 and lower arm 833 in a manner that facilitates maximum adjustability within a variety of planes. Upper arm 831 has a rounded lower end portion resembling a ball that is adapted for coupling with female socket to define the junction at ball-socket coupler 825. The ball-and-socket junction at ball-socket coupler 825 allows frame 830 to swivel so that both rotational and angular adjustments may be made to modify orientation and thus optimize water delivery to a designated area. Frame 830 may be swiveled to tailor the sprinkler coverage area to the size and shape of the lawn area to be watered. By tailoring the sprinkler coverage area to the designated area to be watered, less water is wasted on unintended areas, thereby reducing the amount of water consumed during the watering process.

A further advantage of the ball-and-socket embodiment 800 depicted in FIG. 6 is the ease with which the coverage area may be changed. As with frame 530 as shown in FIG. 5, embodiment 800 depicted in FIG. 6 may also be employed with a legged or otherwise formed base 840.

Figure 7:
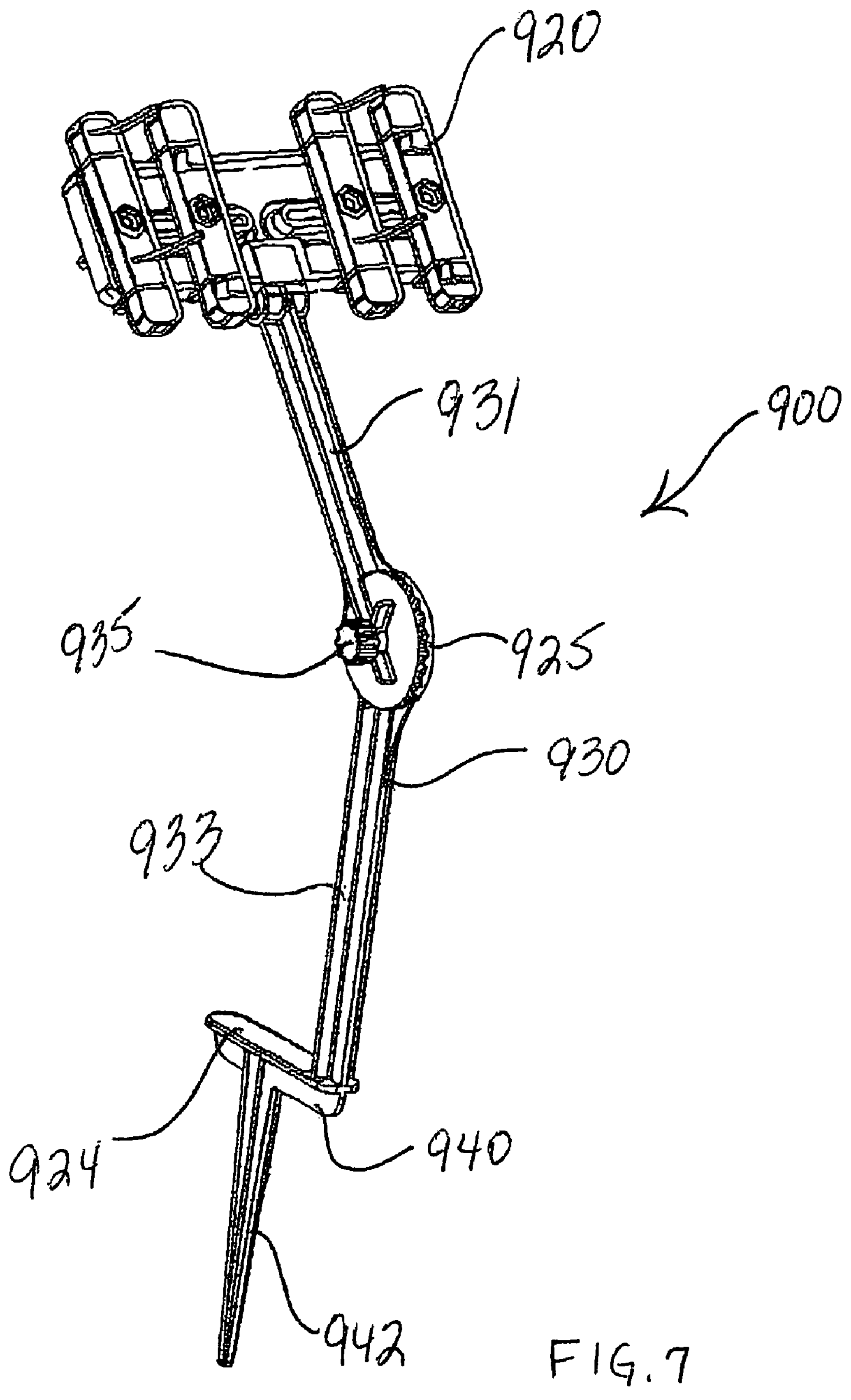
FIG. 7 is a perspective view of yet a further embodiment of the invention.

Referring now to FIG. 7, sprinkler system 900 of the present invention is shown. Sprinkler stand 920 engages a sprinkler (not shown), much the same as the earlier referenced embodiments, holding same in a vertically adjustable position relative to the ground in order to enhance selectability of desired spray patterns and/or sprinkler coverage area. Frame 930 that supports and elevates sprinkler holder 920, and base 940 that supports and maintains frame 930 in a generally vertical and stable position are shown.

As with embodiment 800 depicted in FIG. 6, frame 930 is composed of two portions, upper arm 931 and lower arm 933, wherein upper and lower arms 931 and 933 are pivotally related to define frame 930. Frame 930 is reinforcedly configured along its length, as shown, but may also be generally cylindrical in shape, or of any suitable and desirable shape and adaptation. Thus, frame 930 may be composed of wood, metal, or a synthetic substance such as PVC that is of sufficient rigidity to support sprinkler holder 925 and an oscillating sprinkler. Further, frame 930 may be solid or hollow or may comprise both solid and hollow portions.

In order to facilitate secure placement on potentially uneven ground surfaces, spike or stake member 942 is provided at base 940, wherein spike or stake member 942 serves to anchor frame 930 to the ground. Stake member 942 preferably includes a longitudinal portion with a pointed extremity for insertion into the ground. Stake member 942 also includes extension 924 generally perpendicular to the longitudinal portion and adapted for receiving an applied force, such as foot pressure, when stake member 942 is driven into the ground. Stake member 942 may be composed of wood, metal, PVC, or other substance having sufficient characteristics for frame 930 support and ground insertion.

Upper arm 931 and lower arm 933 are adjustably, rotationally coupled by gear-lock coupler 925. Gear-lock coupler 925 is generally discus-shaped and adapted to connect upper arm 931 and lower arm 933 in a manner that facilitates raising and lowering of upper arm 931 relative to lower arm 933, within a single-plane. Such adjustment enables selection of watering arc via positioning of the sprinkler held thereon.

Upper arm 931 has a gear, or ratchet-style lower end portion that is adapted for coupling with mate gear, or ratchet-style upper end of lower arm 933. The configuration as shown is not intended to be limiting, wherein any suitable confirmation could be utilized, such as one end enveloping a central gear, or any other functionally similar configuration. Thumbscrew 935 functions to secure the selected placement and configuration of gear-lock coupler 925. The adjustable junction at gear-lock coupler 925 allows frame 930 to be angularly adjusted in order to modify orientation and thus optimize water delivery to a designated area. By tailoring the sprinkler coverage area to the designated area to be watered, less water is wasted on unintended areas, thereby reducing the amount of water consumed during the watering process. Again, as with other embodiments of the device, embodiment 900 depicted in FIG. 7 may also be employed with a legged or otherwise formed base 940.

While particular embodiments of the present invention have been described herein; it will be apparent to those skilled in the art that alterations and modifications may be made to the described embodiments within departing from the scope of the appended claims.

What is claimed is:

1. A sprinkler stand for use with an oscillating sprinkler having a base width, an elongate base length, and an elongate water dispensing element, comprising:

- a sprinkler holder adapted to engage the elongate base length of the oscillating sprinkler and maintain the oscillating sprinkler in one of a plurality of selectable angular orientations relative to a ground surface;
- a frame coupled to said sprinkler holder to support said sprinkler holder at a desired height, said frame having a first elongated member, a second elongated member, and a ball-and-socket junction, wherein said first elongated member has a first end disposed proximate said sprinkler holder and a second end engaged with said ball-and-socket junction, wherein said second elongated member has a first end engage with said ball-and-socket junction and a second end engaged with a base, and wherein said first and second elongated members are adjustably and rotatively engaged with and relative to one another by said ball-and-socket junction such that said frame may be selectively straight or angled according to said adjustable engagement of said first elongated member and said second elongated member, and such that the elongate water dispensing element of the oscillating sprinkler may be selectively positioned for water dispensing according to said rotative engagement of said first elongated member and said second elongated member; and
- a base coupled to said frame.

2. The sprinkler stand of claim 1, further comprising a ball-and-socket tightening member, wherein said adjustable and rotative engagement between said first and second elongated members is selectively secured by said ball-and-socket tightening member, such that said selectively straight or angled frame and the selectively positioned water dispensing element may be fixedly arranged.

3. The sprinkler stand of claim 1, wherein said sprinkler holder comprises at least one track adapted to receive a base member of the elongate base length of the oscillating sprinkler.

4. The sprinkler stand of claim 3, further comprising a crossbar coupled to said at least one track.

5. The sprinkler stand of claim 4, wherein said track is adapted to allow moveable adjustment of the base member, along the elongate base length of the oscillating sprinkler, within said track.

6. The sprinkler stand of claim 4, wherein said track comprises two opposing parallel members.

7. The sprinkler stand of claim 4, wherein said track is of a predetermined width to allow compression fitting of a portion of the base member within said track.

8. The sprinkler stand of claim 4, wherein the width of said track is slidably adjustable by movement along said crossbar.

9. The sprinkler stand of claim 4, further comprising two tracks, wherein said tracks are separated by a predetermined distance such that each said track may receive a portion of the base member of the elongate base length of the oscillating sprinkler, wherein said portion received by a first said track is of a first side of said base width of the base member, and wherein said portion received by a second said track is of a second side of said base width of the base member, said first side and said second side opposingly related to one another.

10. The sprinkler stand of claim 4, further comprising two tracks, wherein a separation distance between said tracks is adjustable.

11. The sprinkler stand of claim 1, wherein said sprinkler holder is movably coupled to said first end of said first elongated member of said frame.

12. The sprinkler stand of claim 1, wherein said sprinkler holder is rotationally adjustable relative to said first end of said first elongated member of said frame.

13. The sprinkler stand of claim 1, wherein said base comprises a stake adapted for ground insertion.

14. A method of irrigation, comprising:

- providing a sprinkler stand, said sprinkler stand comprising:
  - a sprinkler holder adapted to engage each of a pair of elongate base members of an oscillating sprinkler and to maintain said sprinkler in a generally non-horizontal orientation;
  - a frame coupled to said sprinkler holder to support said sprinkler holder at an adjustable height relative to the ground, said frame having an articulating junction positioned between a first elongate frame element and a second elongate frame element, wherein said first elongate frame element carries said sprinkler holder; and a base coupled to said frame, wherein said second elongate frame element carries said base; and
- coupling an oscillating sprinkler to said sprinkler stand in a generally non-horizontal orientation.

* * * * *